J. A. JAMISON.
RAIL BOND.
APPLICATION FILED AUG. 10, 1910.
983,235.
Patented Jan. 31, 1911.
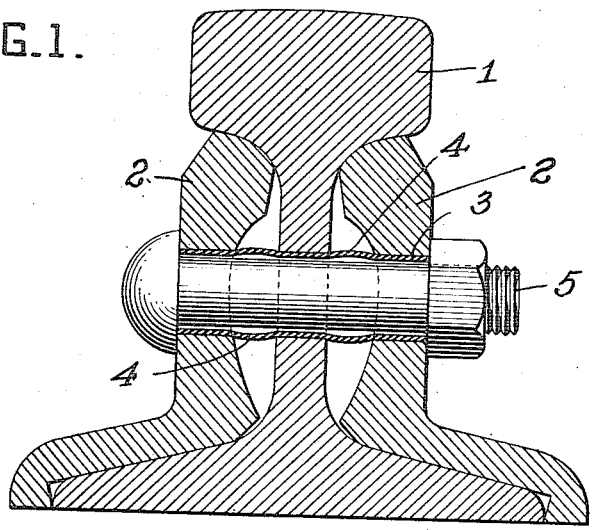
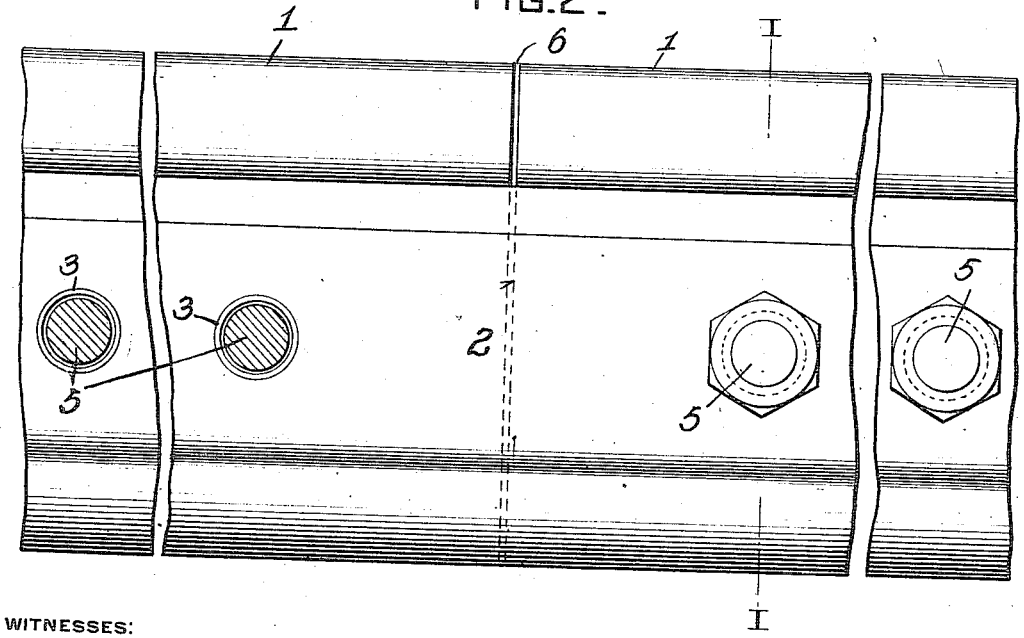
WITNESSES:
J. Hebert Bradley
Theodore Duff
INVENTOR
John Atkinson Jamison
by Christy and Christy
Atty's

UNITED STATES PATENT OFFICE.

JOHN ATKINSON JAMISON, OF WILKINSBURG, PENNSYLVANIA.

RAIL-BOND.

983,235.   Specification of Letters Patent.   Patented Jan. 31, 1911.

Application filed August 10, 1910. Serial No. 576,509.

*To all whom it may concern:*

Be it known that I, JOHN ATKINSON JAMISON, residing at Wilkinsburg, in the county of Allegheny and State of Pennsylvania, a citizen of the United States, have invented or discovered certain new and useful Improvements in Rail-Bonds, of which improvement the following is a specification.

My invention relates to the electrical connection of abutting or adjacently disposed bodies, such as railway-rails which carry electrical currents, and the object of my invention is to provide a more simple, secure and durable connection than any heretofore used. In order to accomplish such an electrical connection in the most practical way it is necessary to have the contact surfaces clean and bright; and it is desirable to have the connection of such a sort as to be applicable to any of the existing standard forms of fish bars without the introduction of large and troublesome accessories and to have the connection so designed that it will withstand the wear due to the intrusion of moisture and to the impact of overpassing loads.

In the accompanying drawings which form part of this specification, Figure 1 is a view in vertical section of a rail with fish bars applied and secured to it and in which my invention is illustrated. The plane of section is indicated by the line I—I, Fig. 2. Fig. 2 is a view in elevation of the adjacent ends of two rails united by fish bars and embodying my invention. In this figure the bolts passing through the rail on the left are shown in section on a plane coincident with the outer surface of the fish bar.

Like numerals indicate corresponding parts in the several figures.

After the rails 1 are placed in position the fish bars 2 are securely bolted thereto leaving one open hole on each side of the joint 6. The said open holes which pass through the rail web and fish bar are then reamed with a suitable device to a diameter large enough to introduce the sleeve 3 which is in form substantially as shown, and of a ductile metallic composition, preferably copper. The said sleeves are then expanded in the direction of their diameter by a device particularly designed for the purpose, or by any suitable method that will give sufficient pressure to the interior of the sleeves to cause their exterior surfaces to firmly adhere to the previously reamed surface of the fish bars and rail. By this operation the sleeve is brought into good and indestructible electrical contact with the fish bars and the web of the rails thereby furnishing a passage for the current from one rail into the fish bars and from thence into the abutting rail. Furthermore, the sleeve will be enlarged into the spaces between rail and fish plate, as indicated at 4, tending consequently to hold the sleeve more securely in place. The joint is completed by introducing a bolt 5 within the sleeve and applying the nut.

It will be observed that the conducting sleeve lies wholly within the bolt hole and the electric joint is completely protected from the weather. Before the sleeve is expanded, it may be slightly longer than the hole which it ultimately fills, and the expansion already described will effect a diminution in length, so that the sleeve will lie entirely within the hole.

I have in this specification described my invention in its application to the bonding of street car rails, to which it is well adapted; it will however be apparent that the invention is capable of being used in other specific applications where adjacent bodies are to be electrically united.

I claim as my invention:

1. An electrical union of two adjacently placed metallic bodies which consists of a sleeve of ductile metal expanded into electric contact upon the walls of a bolt hole extending through both bodies, and a bolt within the sleeve whose head and nut bear upon the two said bodies beyond the ends of said included sleeve, substantially as described.

2. A rail joint consisting of two adjacent rails, and a fish plate overlapping their ends, bolt holes extending through said fish plate and the webs of the rails, metallic bushings lying wholly within said bolt holes bridging the spaces between fish plate and rails and expanded into electrical union with both bodies, and bolts extending through said bushings, structurally uniting said rails and fish plate, and affording protection against weather to the electric joint, substantially as described.

In testimony whereof, I have hereunto set my hand.

JOHN ATKINSON JAMISON.

Witnesses:
BAYARD H. CHRISTY,
PAUL N. CRITCHLOW.